United States Patent [19]

Nogle et al.

[11] Patent Number: 5,334,112
[45] Date of Patent: Aug. 2, 1994

[54] INPUT COMPOUNDING TORQUE CONVERTER

[75] Inventors: Thomas D. Nogle, Troy; Valentin Botosan, Rochester Hills, both of Mich.

[73] Assignee: Chrysler Corporation, Highland Park, Mich.

[21] Appl. No.: 960,161

[22] Filed: Oct. 13, 1992

[51] Int. Cl.⁵ .................................................. F16H 47/08
[52] U.S. Cl. ................................... 475/59; 192/3.23; 192/3.29; 192/3.34
[58] Field of Search ........................ 475/47, 59, 60; 192/3.23, 3.24, 3.29, 3.34

[56] References Cited

U.S. PATENT DOCUMENTS

| | | |
|---|---|---|
| 476,101 | 5/1892 | Thomson . |
| 1,203,265 | 10/1916 | Radcliffe ..................... 192/3.24 X |
| 1,417,797 | 5/1922 | Cook et al. . |
| 1,435,821 | 11/1922 | Dorsey . |
| 1,819,606 | 8/1931 | Jones . |
| 1,949,816 | 3/1934 | Smith-Clarke ..................... 475/47 |
| 2,178,613 | 11/1939 | Seeck . |
| 2,270,581 | 1/1942 | Clarke . |
| 2,361,105 | 10/1944 | Jandasek ..................... 475/47 X |
| 2,791,919 | 5/1957 | Wildhaber . |
| 2,834,229 | 5/1958 | Graybill . |
| 2,920,728 | 1/1960 | Förster ..................... 192/3.29 |
| 2,929,270 | 3/1960 | Tuck et al. ..................... 475/47 |
| 2,943,516 | 7/1960 | Herndon ..................... 192/3.23 X |
| 2,978,929 | 4/1961 | Roberts . |
| 3,041,892 | 7/1962 | Schjolin ..................... 192/3.23 X |
| 3,217,563 | 11/1965 | Simpson . |
| 3,238,814 | 3/1966 | Jandasek . |
| 3,263,525 | 8/1966 | Jandasek . |
| 3,263,527 | 8/1966 | Stockton . |
| 3,292,456 | 12/1966 | Saari . |
| 3,296,894 | 1/1967 | Moan . |
| 3,354,746 | 11/1967 | Paredes . |
| 3,406,593 | 10/1968 | Vesey . |
| 3,706,239 | 12/1972 | Myers . |
| 4,014,223 | 3/1977 | Pierce, Jr. . |
| 4,082,475 | 4/1978 | Kuder . |
| 4,105,102 | 8/1978 | Nels . |
| 4,240,532 | 12/1980 | Blomquist . |
| 4,289,048 | 9/1981 | Mikel et al. . |
| 4,382,393 | 5/1983 | Bowen ..................... 475/47 |
| 4,398,436 | 8/1983 | Fisher . |
| 4,592,250 | 6/1986 | Plasencia et al. . |
| 4,756,210 | 7/1989 | Franklin et al. . |
| 4,867,290 | 9/1989 | Macdonald et al. . |
| 5,045,035 | 9/1991 | Ganoung . |

FOREIGN PATENT DOCUMENTS

| | | |
|---|---|---|
| 835497 | 12/1938 | France . |
| 1069200 | 7/1954 | France ..................... 475/60 |

OTHER PUBLICATIONS

Publication by Antonov Automotive Technologies B.V. (Publication date unknown).

"The New Buick Special Automatic Transmission—The Dual Path Turbine Drive" by C. S. Chapmanand R. J. Gorsky, 1961.

"The New Dynaflow Automatic Transmission", by R. J. Gorsky, 1956.

"The Buick Flight Pitch Dynaflow", by F. McFarland and C. S. Chapman, 1958.

*Primary Examiner*—Richard M. Lorence
*Attorney, Agent, or Firm*—Edward P. Barthel

[57] ABSTRACT

An input compounding torque converter is provided for converting and multiplying torque from a prime mover to an input shaft of a transmission. The input compounding torque converter includes an impeller operatively connected for rotation with a prime mover and a turbine fluidly connected in driving relationship with the impeller for receiving torque from the impeller. The input compounding torque converter also includes a bidirectional planetary gearset and brake interconnecting the turbine and an input shaft of a transmission for multiplying torque from the turbine to the input shaft regardless of the power flow direction.

18 Claims, 2 Drawing Sheets

|  | FIRST | SECOND | THIRD | FOURTH |
|---|---|---|---|---|
| BASE THREE-SPEED | 2.69 | 1.55 | 1.00 | — |
| WITH 1.37:1 COMPOUNDER | 3.69 | 2.12 | 1.37 | 1.00 |
| OR | 3.69 | 2.12 | 1.55 | 1.00 |
| OR | 3.69 | 2.69 | 1.55 | 1.00 |
| WITH 1.58:1 COMPOUNDER | 4.25 | 2.45 | 1.58 | 1.00 |
| OR | 4.25 | 2.45 | 1.55 | 1.00 |
| OR | 4.25 | 2.69 | 1.55 | 1.00 |

FIG. 2.

INPUT COMPOUNDING TORQUE CONVERTER

BACKGROUND OF THE INVENTION

1. Field OF the Invention

The present invention relates generally to a transmission primarily intended for motor vehicle use, and more particularly to a torque converter for a transmission.

2. Description of the Related Art

Generally speaking, land vehicles require three basic components. These components include a power plant (such as an internal combustion engine), a power train and wheels. The power train's main component is typically referred to as the "transmission". Engine torque and speed are converted in the transmission in accordance with the tractive-power demand of the vehicle. A conventional automatic transmission includes a hydrodynamic torque converter to transfer engine torque from the engine crankshaft to a rotatable input member of the transmission through fluid-flow forces. Examples of such torque converters are disclosed in U.S. Pat. Nos. 4,240,532 and 4,289,048 which are assigned to the same assignee as the present invention.

One disadvantage of the above patented torque converters is that the transmission torque capacity is not fully utilized when mated with lower torque engines. Another disadvantage is that there is no torque compounding or multiplication for the engine input above the converter's coupling-point speed. Yet another disadvantage is that there is no means for making a ratio shift (upshift/downshift) within these units.

SUMMARY OF THE INVENTION

It is, therefore, one object of the present invention to provide an input compounding, or two speed, torque converter for a vehicle transmission.

It is another object of the present invention to provide a relatively low-cost input compounding torque converter.

It is yet another object of the present invention to provide a relatively compact input compounding torque converter.

It is still another object of the present invention to provide a relatively light-duty input compounding torque converter.

It is a further object of the present invention to provide an input compounding torque converter which allows low torque engines to achieve an improved match with higher capacity transmissions.

It is yet a further object of the present invention to provide an input compounding torque converter with an additional, selectable, geartrain ratio when used with any suitable base-speed transmission.

It is still a further object of the present invention to provide an input compounding torque converter which inherently (without special control inputs) provides for reverse power flow (engine braking) in all driving ratios, both forward and reverse.

To achieve the foregoing objects, the present invention is an input compounding torque converter for converting and multiplying torque from a prime mover to an input shaft of a transmission. The input compounding torque converter includes impeller means operatively connected for rotation with a prime mover and turbine means fluidly connected in driving relationship with the impeller means for receiving torque from the impeller means. The input compounding torque converter also includes bidirectional means interconnecting the turbine means and an input shaft of a transmission such that torque from the turbine means is further multiplied ahead of the input shaft including engine-braking conditions when power flows from the input shaft to the turbine means.

One advantage of the present invention is that the input compounding torque converter multiplies or compounds engine output for use of the transmission with smaller capacity engines. Another advantage of the present invention is that the input compounding torque converter is relatively compact and fits into existing space or envelope of present transmissions, thereby eliminating any vehicle adaptation. Yet another advantage of the present invention is that the input compounding torque converter is relatively light-duty and low-cost. Still another advantage of the present invention is that the input compounding torque converter provides power train flexibility by adding a planetary gearset and a gear-thrust-actuated brake such that engagement of the converter clutch (typically referred to as "lock-up") upshifts the planetary gearset to a direct ratio, thereby allowing, for example, a fourth transmission geartrain ratio when used with a 3-speed transmission. A further advantage of the present invention is that the added geartrain ratio improves vehicle performance and fuel economy. Yet a further advantage of the present invention is that the input compounding torque converter maintains a direct top gear and not an overdrive top gear when used with a base speed transmission having a direct top gear. A still further advantage of the present invention is that the input compounding torque converter provides engine braking in all ratios whether locked or unlocked due to the unique characteristics of the gear-thrust-actuated brake arrangement which prevents the sun gear from rotating in either direction when torque in either direction exists in the gearset, and allows the sun gear to rotate freely with the gearset when no gearset torque exists.

Other objects, features and advantages of the present invention will be readily appreciated as the same becomes better understood after reading the following description taken in conjunction with the accompanying drawings.

BRIEF DESCRIPTION OF THE DRAWINGS

FIG. 2 is a chart which summarizes example gear ratio combinations for the input compounding torque converter of FIG. 1 when used in combination with an example three-speed automatic transmission.

DESCRIPTION OF THE PREFERRED EMBODIMENT(S)

Figure 1:
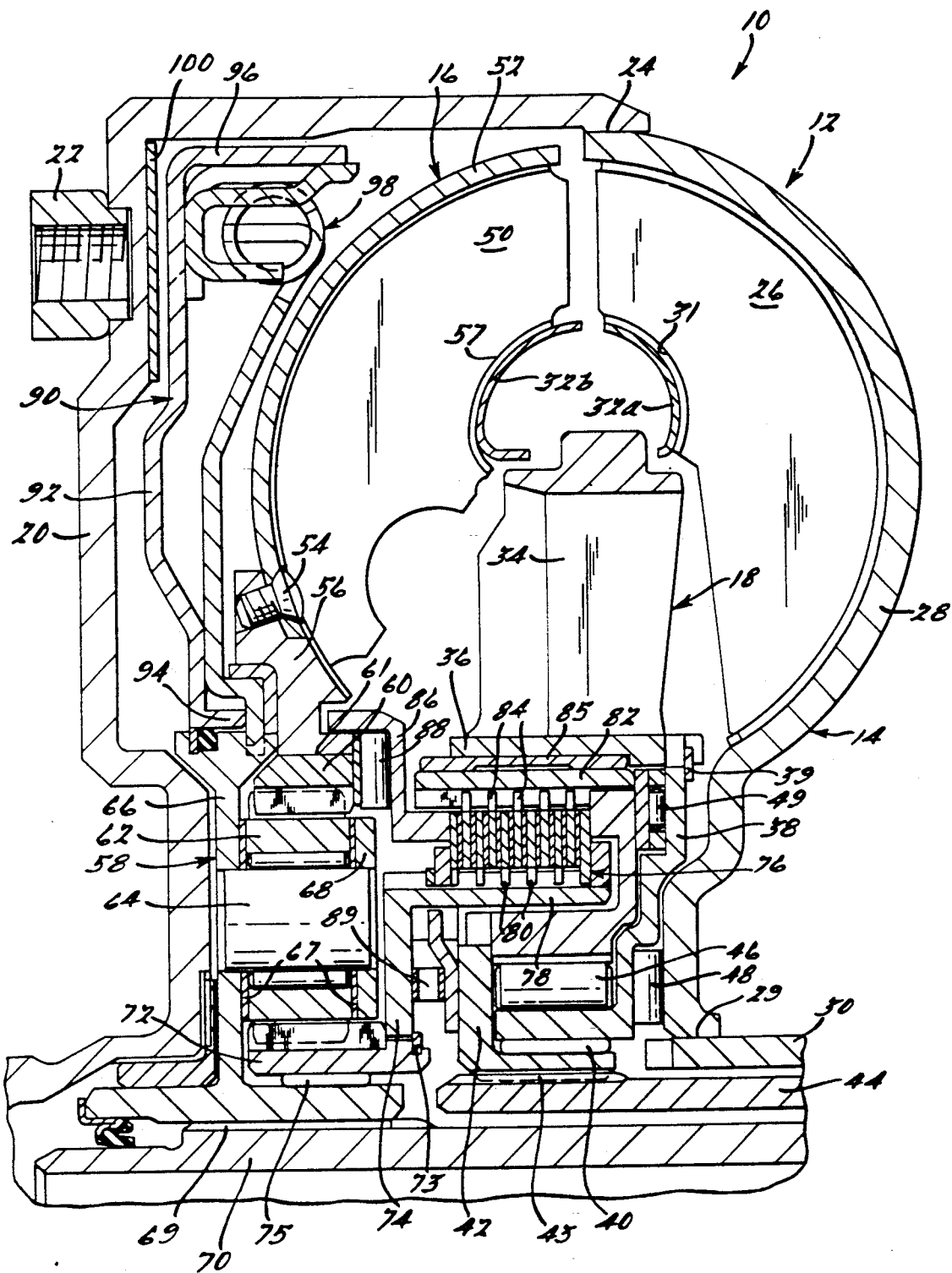
FIG. 1 is a sectional elevational view of an input compounding torque converter according to the present invention illustrated in operational relationship with a transmission.

Referring to FIG. 1, a transmission such as an automatic transmission according to one embodiment of the present invention is partially shown. The transmission is adapted for use in a vehicle (not shown) such as an automotive vehicle. However, it should be appreciated that the principles of the present invention may be employed in other types of vehicles and devices.

The transmission includes an input compounding torque converter, according to the present invention and generally indicated at 12, for transmitting torque from a rotating crankshaft (not shown) of a prime mover such as an engine (not shown) to a transmission input member 70 of any suitable ongoing transmission. The transmission may then subsequently distribute this torque to one or more drive wheels (not shown) of the vehicle. It should be appreciated that the input compounding torque converter 12 may be used in an automatic transmission of the type disclosed in U.S. Pat. No. 4,875,391, assigned to the same assignee as the present invention. It should also be appreciated that the input compounding torque converter 12 may be used in other types of transmissions such as continuously variable transmissions.

As illustrated in FIG. 1, the input compounding torque converter 12 generally includes an impeller assembly 14, turbine assembly 16, a stator assembly 18, compounding gear assembly 58, brake assembly 76, and a lock-up clutch assembly 90 to be described. Power or torque is transmitted from the rotating crankshaft of the engine to a front cover member 20 of the impeller assembly 14. The front cover member 20 may include a plurality of input drive lugs or threaded connectors 22. A rotatable plate member (not shown) is secured to the front cover member 20 by suitable fastening means such as bolts (not shown) which are received in the connectors 22 as is commonly known in the art. The front cover member 20 is secured, such as by welding at 24, to the impeller assembly 14 of the input compounding torque converter 12.

The impeller assembly 14 is fluidly connected in torsional flow relationship in a known manner with the turbine assembly 16 and the stator assembly 18. The impeller assembly 14 includes a plurality of circumferentially spaced impeller blades 26 connected to the inside of an impeller shell 28. The impeller shell 28 is secured, such as by welding at 29, to an impeller hub or pump drive shaft 30. The impeller hub 30 is drivingly engaged to a pump (not shown) from which fluid is supplied to the input compounding torque converter 12. The impeller blades 26 have an arcuate inner portion 31 disposed about one half 32a of a split torus ring 32 which reduces fluid turbulence within the input compounding torque converter 12.

The stator assembly 18 includes a plurality of circumferentially spaced stator vanes 34 which are connected at their inner end to a stator plate 36. The stator plate 36 is connected to a stator hub 38 via interlocking lugs and retaining ring 39. The stator hub 38 is mounted on a bushing 40 which, in turn, is mounted on a stationary stator reaction member 42. The stator reaction member 42 is connected, such as by a spline connection 43, to a stationary reaction shaft 44. The stator hub 38 and stator reaction member 42 serve as a race and cam for a plurality of rollers 46 disposed therebetween which act as a free wheel or one-way clutch to allow the stator vanes 34 to rotate only in the same direction as the impeller assembly 14 and turbine assembly 16 during both converter coupling and lock-up operation. Annular thrust bearings 48 and 49 are disposed between the stator hub 38 and the impeller shell 28 and the stator hub 38 and stationary reaction member 42. It should be appreciated that other suitable types of one-way clutches may be used.

The turbine assembly 16 includes a plurality of circumferentially spaced turbine blades 50 which are connected to the inside of a turbine shell 52. The turbine shell 52 is secured, such as by screws 54, to a turbine hub member 56. The turbine blades 50 have an arcuate inner portion 57 disposed about the other half 32b of the split torus ring 32 previously described.

The compounding planetary gearset or gear assembly, generally indicated at 58, multiplies or compounds torque from the turbine assembly 16 to the transmission input member 70. The compounding gear assembly 58 includes an annulus gear 60 secured, such as by welding 61, to the turbine hub member 56. The compounding gear assembly 58 also includes a plurality of circumferentially spaced planetary pinion gears 62 mounted about planetary pinion shafts 64 which are connected to a planetary carrier 66. The planetary pinion gears 62, along with thrust washers 67, are held on the planetary pinion shafts 64 via plate member 68. The planetary carrier 66 is drivingly connected, such as by a spline connection 69, to a rotatable transmission input member 70 for the ongoing transmission. The compounding gear assembly 58 further includes a sun gear 72 engaging the pinion gears 62 and is connected via lugs and retaining ring 73 to a sun hub member 74. A bushing 75 is disposed between the sun gear 72 and the planetary carrier 66. The gears 60, 62 and 72 have predetermined helix angles such as from twenty to thirty degrees (20°-30°).

The input compounding torque converter 12 includes a brake assembly, generally indicated at 76, for coupling or braking the sun gear 72 to the stationary reaction member 42. The brake assembly 76 includes an axially extending portion 78 of the sun hub member 74 having a plurality of axially spaced annular brake plates 80. The brake assembly 76 also includes an axially extending portion 82 of the stator reaction member 42 having a plurality of axially spaced annular brake discs 84. The brake discs 84 are alternated between the brake plates 80 and, when the brake assembly 76 is not applied, the brake plates 80 are free to move or rotate relative to the brake discs 84. A bushing 85 is disposed between the axially extending portion 82 and the stator plate 36. The brake assembly 76 includes an axially and radially extending piston 86 extending from an end brake plate 80 to the annulus gear 60. A thrust bearing 88 is disposed between the piston 86 and hub member 56 and annulus gear 60. A spring 89 having a low spring rate is disposed between the stator reaction member 42 and the sun hub member 74. It should be appreciated that other bushings, retainer members and the like may be used and are illustrated in FIG. 1 although not specifically described.

When applied, the lock-up clutch assembly, generally indicated at 90, prevents slip between the rotating crankshaft of the engine and the planetary carrier 66 of the compounding gear assembly 58. The lock-up clutch assembly 90 includes an annular piston member 92 having an inner flange portion 94 slidingly and sealingly mounted for axial movement on the planetary carrier 66 of the compounding gear assembly 58. The piston member 92 has an outer flange portion 96 connected to a torsional isolation mechanism, generally indicated at 98, which is drivingly connected to the planetary carrier 66. Such a torsional isolation mechanism is disclosed in U.S. Pat. Nos. 4,240,532 and 4,289,048, the disclosures of both patents are hereby incorporated by reference. The lock-up clutch assembly 90 further includes an annular disc-shaped frictional element or lock-up disc 100 carried proximate the outer periphery of the front cover member 20 for engagement with a cooperating portion of the piston member 92. It should be appreciated that the torsional isolation mechanism 98 is optional and may not be needed for "smooth-running"

power sources or if "partial lock" is used (e.g., controlled, slight slip).

OPERATION OF THE TORQUE CONVERTER

Rotation of the crankshaft of the engine causes the front cover member 20 to rotate with it due to the connection with the plate member (not shown). Since the front cover member 20 is welded at 24 to the impeller shell 28 of the impeller assembly 14, the impeller assembly 14 also rotates with the crankshaft. The fluid within the impeller assembly 14 is set into motion by the rotation of the impeller assembly 14 and kept filled by the fluid pressure from a pump (not shown). The impeller blades 26 start to carry the fluid around with them. As the fluid is spun around by the impeller blades 26, it is thrown outward by centrifugal force and into the turbine assembly 16 at an angle. The fluid strikes the turbine blades 50 of the turbine assembly 16, thus imparting torque, or turning effort to the turbine assembly 16 and causing the turbine shell 52 and the turbine assembly 16 to rotate. Since the turbine shell 52 is connected by screws 54 to the turbine hub 56 which is, in turn, connected to the annulus gear 60 of the compounding gear assembly 58, the annulus gear 60 rotates with the turbine assembly 16.

During downshifted, compounding, driving operation of the input compounding torque converter 12, the lock-up piston 92 is not applied. Rotation of the annulus gear 60 causes the planetary pinion gears 62 to rotate, in turn, causing rotation of the planetary carrier 66. Driving torque causes the gearset helix angles to thrust the sun gear 72 toward the front cover member 20 and load the brake assembly 76 in the same direction. The piston 86, activated by the thrust (opposite, but equal to the sun thrust) of the annulus gear 60 and the turbine assembly 16, generates a reaction for the brake assembly 76 to be engaged. As a result, the sun gear 72 is coupled to the stationary reaction member 42 and held stationary during the flow of power. Since the planetary carrier 66 is splined at 69 to the transmission input member 70, the transmission input member 70 rotates due to rotation of the planetary carrier 66. Thus, torque is imparted to the transmission input member 70 via the compounding gear assembly 58. It should be appreciated that the torque capacity of the brake assembly 76 is directly proportional to the clamping force which is also directly proportional to the gear torque via the chosen helix angle.

However, during lock-up of the input compounding torque converter 12 for both engine-driving and engine-braking operation, fluid pushes the lock-up piston 92 against the front cover member 20 with the friction disc 100 sandwiched between the two elements. The flow of power or engine torque is then transmitted through the front cover member 20, the lock-up piston 92 and torsional mechanism 98, in turn, to the planetary carrier 66. Since this eliminates turbine and annulus gear torque, gear thrust loads disappear and the brake assembly 76 releases, allowing the sun gear 72 to also rotate freely in the same direction as the planetary carrier 66 and the annulus gear 60. Further, the spring 89 prevents unwanted viscous drag from engaging the brake assembly 76. Thus, the turbine assembly 16, planetary carrier 66 and transmission input member 70 rotate together. It should be appreciated that the stator assembly 18 may independently free wheel via its one-way clutch 46.

During unlocked engine braking, the helix angles cause the thrust of the sun gear 72 to move away from the front cover member 20 and engage the plates 80 and discs 84 of the brake assembly 76 against the reaction member 42. The sun gear 72 is held stationary by being coupled to the stationary reaction member 42. The flow of power is reversed from normal operation and is transmitted from the transmission input member 70, through the planetary carrier 66, turbine assembly 16, impeller assembly 14 and to the engine. As a result, lock-up operation of the input compounding torque converter 12 is not required for engine braking.

As illustrated in FIG. 2, a chart of example gear ratio combinations is shown for a transmission such as a base three speed automatic transmission. The compounding gear assembly 58 may have, for example, either a 1.37 to 1 or 1.58 to 1 gear ratio. It should be appreciated that all six ratios may be used in a variety of driver- or computer-selected four speed shift patterns.

Accordingly, the input compounding torque converter 12 provides a two speed fluid coupling and a relatively simple, low cost form of compounder. The input compounding torque converter 12 multiplies turbine torque by the compounding gear assembly 58 in conjunction with the self-actuating reaction brake assembly 76, thereby allowing lower torque engines to fully utilize higher capacity transmissions. The input compounding torque converter 12 provides engine braking in all ratios whether locked or unlocked. Further, when upshifted, the compounding gear assembly 58 provides a direct power transmission and not an overdrive. Finally, the input compounding torque converter 12 accomplishes torque compounding or multiplication with one planetary gearset, brake assembly and free-wheel, and is upshifted/downshifted via lock-up/unlock demand.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An input compounding torque converter for converting and multiplying torque from a prime mover to an input shaft of a transmission, comprising:
   impeller means operatively connected for rotation with a prime mover;
   turbine means fluidly connected in driving relationship with said impeller means for receiving torque from said impeller means;
   a planetary gear assembly interconnecting said turbine means and an input shaft of a transmission for multiplying torque from said turbine means to the input shaft and a self-energizing brake assembly interconnecting a predetermined gear of said planetary gear assembly and a stationary portion of the transmission for holding stationary said predetermined gear against rotation in either direction of rotation when applied and allowing freewheeling motion of said predetermined gear in either direction when released.

2. An input compounding torque converter as set forth in claim 1 wherein said planetary gear assembly comprises an annulus gear connected to said turbine means, a planetary carrier connected to the input shaft, a sun gear connected to said brake assembly, and a plurality of planetary pinion gears rotatably supported on said planetary carrier and engaging said sun and annulus gears.

3. An input compounding torque converter as set forth in claim 1 including stator means fluidly connected between said impeller means and said turbine means.

4. An input compounding torque converter as set forth in claim 3 including stationary means for interconnecting said stator means to a stationary portion of a transmission.

5. An input compounding torque converter as set forth in claim 4 wherein said stationary means includes one-way clutch means for holding stationary said stator means against rotation in a direction opposite to the direction of rotation of said impeller means and allowing freewheeling motion of said stator means in the same direction as said impeller means.

6. An input compounding torque converter as set forth in claim 2 wherein said brake assembly includes a plurality of plates operatively connected to said sun gear and a plurality of discs operatively connected to a stationary portion of a transmission for holding stationary said sun gear against rotation in either direction when gearset torque exists and allowing freewheeling motion of said sun gear in either direction when gearset torque does not exist.

7. An input compounding torque converter as set forth in claim 1 including a front cover member connected to said impeller means and rotatingly drivingly engageable with the prime mover.

8. An input compounding torque converter as set forth in claim 7 including means for locking and unlocking said planetary carrier to said front cover member.

9. An input compounding torque converter for converter and multiplying torque from a prime mover to an input shaft of a transmission, comprising:
   impeller means operatively connected for rotation with a prime mover;
   turbine means fluidly connected in driving relationship with said impeller means for receiving torque from said impeller means;
   a planetary gear assembly interconnecting said turbine means and an input shaft of a transmission for multiplying torque from said turbine means to the input shaft and a brake assembly operatively cooperating with said gear assembly;
   said planetary gear assembly comprising an annulus gear connected to said turbine means, a planetary carrier connected to the input shaft, a sung gear connected to said brake assembly, and a plurality of planetary pinion gears rotatably supported on said planetary carrier and engaging said sun and annulus gears; and
   wherein said annulus gear, sun gear and pinion gears have predetermined helix angles as required to provide all self-energization of said brake assembly.

10. An input compounding torque converter for converting and multiplying torque from a prime mover to an input shaft of a transmission, comprising:
    impeller means operatively connected for rotation with a prime mover;
    turbine means fluidly connected in driving relationship with said impeller means for receiving torque from said impeller means;
    planetary gear means interconnecting said turbine means and an input shaft of a transmission for multiplying torque from said turbine means to the input shaft, said planetary gears means comprising an annulus gear connected to said turbine means, a planetary carrier connected to an input shaft, a sun gear, and a plurality of planetary pinion gears rotatably supported on said planetary carrier and engaging said sun and annulus gears; and
    brake means interconnecting said sun gear and a stationary portion of the transmission for holding stationary said sun gear against rotation in either direction of rotation when applied and allowing freewheeling motion of said sun gear in either direction when released.

11. An input compounding torque converter as set forth in claim 10 including stator means fluidly connected between said impeller means and said turbine means and one-way clutch means for holding stationary said stator means against rotation in a direction opposite to the direction of rotation of said impeller means and allowing freewheeling motion of said stator means in the other direction.

12. An input compounding torque converter as set forth in claim 11 wherein said one-way clutch means comprises a plurality of rollers and said stator means comprises a stator hub, and a plurality of stator blades connected to said stator hub, said stator hub being mounted on said rollers.

13. An input compounding torque converter as set forth in claim 10 including a stationary reaction member interconnecting said brake means and a stationary portion of a transmission.

14. An input compounding torque converter as set forth in claim 13 wherein said brake means comprises a plurality of discs operatively connected to said stationary reaction member and a plurality of plates operatively connected to said sun gear.

15. An input compounding torque converter as set forth in claim 10 including a front cover member connected to said impeller means and rotatingly drivingly engageable with the prime mover.

16. An input compounding torque converter for converting and multiplying torque from a prime mover to an input shaft of a transmission, comprising:
    impeller means operatively connected for rotation with a prime mover;
    turbine means fluidly connected indicting relationship with said impeller means for receiving torque from said impeller means;
    planetary gear means interconnecting said turbine means and an input shaft of a transmission for multiplying torque from said turbine means to the input shaft;
    brake means interconnecting a predetermined gear of said planetary gear means and a stationary portion of the transmission for holding stationary said predetermined gear against rotation in either direction of rotation when applied and allowing freewheeling motion of said predetermined gear in either direction when released;
    said planetary gear means comprising an annulus gear connected to said turbine means, a planetary carrier connected to an input shaft, a sun gear operatively connected to said brake means, and a plurality of planetary pinion gears rotatably supported on said planetary carrier and engaging said sun and annulus gears; and
    said annulus gear, sun gear, and pinion gears having helix angles as required to provide all self-energization of said brake means.

17. An input compounding torque converter for converting and multiplying torque from a prime mover to an input shaft of a transmission, comprising:

impeller means operatively connected for rotation with a prime mover;

turbine means fluidly connected indicting relationship with said impeller means for receiving torque from said impeller means;

planetary gear means interconnecting said turbine means and an input shaft of a transmission for multiplying torque from said turbine means to the input shaft;

brake means interconnecting a predetermined gear of said planetary gear means and a stationary portion of the transmission for holding stationary said predetermined gear against rotation in either direction of rotation when applied and allowing freewheeling motion of said predetermined gear in either direction when released;

a front cover member connected to said impeller means and rotatingly drivingly engagement with the prime mover; and a friction disc disposed between said front cover member and a piston member which is connected to said planetary carrier and operatively cooperating with said friction disc, and a torsional isolation mechanism interconnecting said piston member and said planetary carrier, said piston member locking and including said planetary carrier to said front cover member.

18. An input compounding torque converter for converting and multiplying torque from a prime mover to an input shaft of a transmission, comprising:

an impeller operatively connected for rotation with a prime mover;

a turbine fluidly connected in driving relationship with said impeller means for receiving torque from said impeller;

a planetary gearset interconnecting said turbine and an input shaft of a transmission for multiplying torque from said turbine to the input shaft;

a stator fluidly connected between said impeller and said turbine;

a one-way clutch for holding stationary said stator against rotation in a direction opposite to the direction of rotation of said impeller and allowing freewheeling motion of said stator in the same direction as said impeller;

said planetary gearset comprising an annulus gear connected to said turbine means, a planetary carrier connected to an input shaft, a sun gear, and a plurality of planetary pinion gears rotatably supported on said planetary carrier and engaging said sun and annulus gears;

a brake connected to said sun gear and a stationary portion of the transmission for holding stationary said sun gear against rotation in either direction when the brake is applied and allowing freewheeling motion of said sun gear in either direction when said brake is released; and a lock-up clutch assembly for locking and unlocking said planetary carrier to the prime mover.

* * * * *